United States Patent
Janampally et al.

(10) Patent No.: US 11,142,208 B2
(45) Date of Patent: Oct. 12, 2021

(54) ROAD LOAD COMPENSATION FOR MATCHING ACCELERATION EXPECTATION

(71) Applicant: TOYOTA MOTOR ENGINEERING & MANUFACTURING NORTH AMERICA, INC., Plano, TX (US)

(72) Inventors: Sandeep Kumar Reddy Janampally, Canton, MI (US); Alejandro M. Sanchez, Ann Arbor, MI (US); Alejandro Martinez, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 275 days.

(21) Appl. No.: 16/510,107

(22) Filed: Jul. 12, 2019

(65) Prior Publication Data

US 2021/0009138 A1    Jan. 14, 2021

(51) Int. Cl.
| | |
|---|---|
| *B60W 40/06* | (2012.01) |
| *B60W 30/19* | (2012.01) |
| *F16H 61/04* | (2006.01) |
| *B60W 10/02* | (2006.01) |
| *F16H 61/02* | (2006.01) |

(52) U.S. Cl.
CPC .......... *B60W 40/06* (2013.01); *B60W 10/026* (2013.01); *B60W 30/19* (2013.01); *F16H 61/04* (2013.01); *F16H 2061/0227* (2013.01); *F16H 2061/0422* (2013.01)

(58) Field of Classification Search
CPC .... B60W 40/06; B60W 10/026; B60W 30/19; B60W 61/04; B60W 2061/0227; B60W 2061/0422
See application file for complete search history.

(56) References Cited

U.S. PATENT DOCUMENTS

| | | | |
|---|---|---|---|
| 7,027,904 B2 | 4/2006 | Ishizu et al. | |
| 8,160,795 B2 * | 4/2012 | Iwatsuki | B60W 30/18145 701/72 |
| 8,935,080 B2 | 1/2015 | Szwabowski et al. | |
| 9,056,607 B2 | 6/2015 | Kresse et al. | |
| 9,221,453 B2 * | 12/2015 | Martin | B60W 10/08 |
| 9,255,529 B2 | 2/2016 | Sladek, Jr. | |

(Continued)

*Primary Examiner* — Tinh Dang
(74) *Attorney, Agent, or Firm* — Haynes and Boone, LLP

(57) ABSTRACT

Disclosed is a vehicle road load compensation system that includes an accelerator pedal, a throttle, a transmission wherein a vehicle torque is generated proportional to the transmission gear and the motor power, and a control unit disposed within the vehicle and configured to receive real-time sensor data relating to the road load of the vehicle. The control unit includes a real-time throttle map relating the accelerator pedal position to the throttle position, such that a given accelerator pedal position directs a corresponding target throttle position. The control unit also includes a real-time shift map relating a desired transmission gear to a current transmission gear, vehicle speed, and throttle position. In response to the sensor data, the control unit updates the throttle map and shift map such that the vehicle torque is altered based on the road load of the vehicle. The controller may also update a real-time torque converter lockup map.

20 Claims, 13 Drawing Sheets

(56) References Cited

U.S. PATENT DOCUMENTS

| | | |
|---|---|---|
| 10,030,598 B2 | 7/2018 | Gennard et al. |
| 10,054,456 B2 * | 8/2018 | Payne ................ G01C 21/3697 |
| 10,100,750 B2 | 10/2018 | Bellino et al. |
| 2002/0115529 A1 * | 8/2002 | Narita ................ F16H 61/6648 |
| | | 477/40 |

* cited by examiner

ROAD LOAD COMPENSATION FOR MATCHING ACCELERATION EXPECTATION

TECHNICAL FIELD

The subject matter described herein relates generally to improving the drivability of a vehicle and, more particularly, to apparatus, systems, and methods for maintaining a constant, consistent relationship between accelerator pedal input and vehicle acceleration for varying road load conditions. This method has particular but not exclusive utility for consumer and commercial cars and trucks with automatic transmission and internal combustion or hybrid propulsion.

BACKGROUND

Drivers and passengers of motor vehicles desire that increases in accelerator pedal deflection should result in smooth, responsive, predictable, and consistent acceleration. However, traditional linear mapping of pedal position to throttle valve position, combined with fixed shift mapping for automatic transmissions, yields several undesirable results due to the effects of road load. These undesirable results include accelerator pedal application which result in unexpectedly high or unexpectedly low acceleration. The acceleration will be less than expected if road load increases and, conversely, higher than expected if road load is decreased. This unpredictability causes the driver to have more difficulty controlling desired speed and acceleration, and can also contribute to periods of flat acceleration before a gear change, and a "stuck" feeling from remaining in the same gear for too long.

After driving a vehicle for a certain duration, a driver becomes accustomed to the vehicle's accelerator pedal and begins to expect a particular vehicle acceleration when applying a particular amount of pressure to depress the accelerator pedal (sometimes referred to as pedal applied). However, vehicle acceleration for a given pedal applied changes as the road load of the vehicle changes, for example, based on vehicle mass (including number of vehicle passengers, cargo, luggage, precipitation loads, etc.), towing, air resistance (headwind/tailwind), grade (uphill/downhill), and/or rolling resistance (friction coefficient). This requires the driver to readjust pedal applied to achieve the same vehicle acceleration for different road load characteristics. For example, for a given pedal applied, vehicle acceleration uphill may be less than vehicle acceleration on a flat road and vehicle acceleration downhill may be greater than the vehicle acceleration on the flat road, requiring the driver to increase pedal applied when traveling uphill and decrease pedal applied when traveling downhill, to achieve the same vehicle acceleration during uphill, downhill, and flat road conditions. Some vehicles have logic that helps to maintain acceleration by compensating engine torque during changes in environmental conditions. However, this logic does not respond to changes in road load, and it can only affect engine torque to attempt to match a predictable vehicle acceleration to a given accelerator pedal input.

When the road load on a vehicle changes (e.g., due to changes in cargo or passenger mass, towed loads, changes in road grade, changes in wind direction or velocity, etc.), the response of the accelerator pedal is altered, such that for a given pedal input, the vehicle may accelerate either more than the customer expects, or less than the customer expects. Such differences between customer expectation and actual vehicle acceleration result in a less satisfactory driving experience, as the acceleration is not the same as compared to normal or ideal driving conditions.

Vehicles currently implement artificial intelligence (AI) logic to address such issues. For example, grade logic can change a transmission shift schedule based on grade to compensate vehicle drive force requirements, and other logic uses engine torque compensation to achieve drive force needed to reach desired acceleration based on acceleration pedal input during engine torque effects due to changes in the environment. However, conventional AI logic still results in accelerator pedal input that varies to achieve the same vehicle acceleration depending on grade condition/changing grade load.

For these and other reasons, throttle mapping and shift mapping during vehicle acceleration present numerous unaddressed challenges in the art. Accordingly, long-felt needs exist for apparatus, systems, and methods that address the forgoing or other concerns.

The information included in this Background section of the specification is included for technical reference purposes only and is not to be regarded as subject matter by which the scope of the disclosure is to be bound.

SUMMARY

Disclosed are apparatus, systems, and methods for smoothing the acceleration profiles of internal combustion vehicles, hereinafter referred to collectively as a "vehicle road load compensation system." The vehicle road load compensation system tracks changes in variables that affect the road load of the vehicle, and may control shift mapping and throttle mapping parameters in real time, to maximize, improve, or otherwise modify vehicle performance based on changing values of variables including but not limited to mass, drag, and grade load. Some embodiments may also control torque converter lockup.

A system of one or more control units can be configured to perform particular operations or actions by virtue of having software, firmware, hardware, or a combination of them installed on the system that in operation causes or cause the system to perform the actions. One or more instruction sets can be configured to perform particular operations or actions by virtue of including instructions that, when executed by data processing apparatus, cause the apparatus to perform the actions. One general aspect includes a vehicle road load compensation system, including: an accelerator pedal disposed within a vehicle and having an accelerator pedal position, a throttle disposed within the vehicle and configured to supply motor power in proportion to a throttle position, a transmission disposed within the vehicle and configured to shift in a shift direction between two or more fixed transmission gears, where a vehicle torque is generated proportional to the transmission gear and the motor power; and a control unit disposed within the vehicle and configured to receive real-time sensor data from one or more sensors relating to a road load of the vehicle. The control unit includes a real-time throttle map relating the accelerator pedal position to the throttle position, such that a given accelerator pedal position directs a corresponding target throttle position. The control unit also includes a real-time shift map relating a desired transmission gear to a current transmission gear, current vehicle speed, and current throttle position, such that a given vehicle speed, given throttle position, and given transmission gear directs a corresponding target transmission gear. In response to the receiving of the real-time sensor data, the control unit updates the real-time throttle map and real-time shift map such that the vehicle torque is altered to a desired torque value based on the road load of the vehicle. Other embodiments of this aspect include corresponding control units, apparatus, and instructions recorded on one or more storage devices, each configured to perform the actions of the methods.

Implementations may include one or more of the following features. The system further including a real-time lockup map relating a torque converter lockup condition to the transmission gear, vehicle speed, and throttle position, such that the given vehicle speed, given throttle position, and given transmission gear directs a corresponding lockup condition selected from locked or not locked based on the road load of the vehicle. The system where at least one of engine torque, shift schedule or lock up schedule are adjusted such that a relationship between the accelerator pedal position and an acceleration of the vehicle remains constant when the road load of the vehicle changes. The system where the desired torque value is selected to reduce a size or a duration of an increase in vehicle acceleration, or to reduce a period of time where the vehicle acceleration is flat. The system where the real-time sensor data includes at least one of carried mass, towed mass, air resistance, grade load, or rolling resistance. The system where at least one of carried mass, towed mass, air resistance, grade load, or rolling resistance is derived from the real-time sensor data. The system where the real-time throttle map is nonlinear. The system where the real-time throttle map is further dependent on the shift direction. The system further including the vehicle. Implementations of the described techniques may include hardware, a method or process, or control unit instructions on a control-unit-accessible medium.

One general aspect includes a method for adjusting a torque of a vehicle to compensate for changes in road load, the method including: measuring a speed and acceleration of the vehicle, measuring an accelerator pedal position of the vehicle, controlling a throttle of the vehicle based on the measured accelerator pedal position and a throttle mapping that relates the accelerator pedal position to a throttle position, where the throttle position is correlated to a motor power. The method also includes controlling a transmission of the vehicle to shift in a shift direction from one fixed transmission gear to a selected fixed transmission gear based on a shift mapping that relates a desired transmission gear to the measured speed of the vehicle and the measured accelerator pedal position, where each transmission gear relates the motor power to a vehicle torque. The method also includes modifying the throttle mapping in real time based on sensor data relating to a road load of the vehicle and modifying the shift mapping in real time based on the sensor data, such that the vehicle torque is altered to a desired torque value based on the road load of the vehicle. Other embodiments of this aspect include corresponding control units, apparatus, and instructions recorded on one or more storage devices, each configured to perform the actions of the methods.

Implementations may include one or more of the following features. The method where the desired torque value is selected to bring the measured acceleration of the vehicle into closer conformance with a desired vehicle acceleration profile based on the road load of the vehicle. The method where the sensor data includes at least one of carried mass, towed mass, air resistance, grade load, or rolling resistance. The method further including controlling a torque converter lockup of the vehicle to select a lockup state selected from locked or unlocked, based on a lockup mapping that relates a desired lockup state to the speed of the vehicle, the throttle position, and the selected fixed transmission gear. The method may also include modifying the lockup mapping in real time based on the sensor data. The method where the throttle mapping is further modified based on the shift direction. The method where the sensor data is employed to derive at least one of carried mass, towed mass, air resistance, grade load, or rolling resistance. The method further including providing the vehicle. Implementations of the described techniques may include hardware, a method or process, or control unit instructions on a control-unit-accessible medium.

One general aspect includes an acceleration compensation apparatus including a memory comprising a real-time throttle map relating an accelerator pedal position of a vehicle to a throttle position of the vehicle, such that a given accelerator pedal position directs a corresponding throttle position, where a motor power of the vehicle is correlated with the throttle position. The acceleration compensation apparatus also includes a real-time shift map relating a desired transmission gear to a current shift direction, vehicle speed, and throttle position, such that a given vehicle speed, throttle position, shift direction and transmission gear directs a corresponding transmission gear, where a torque of the vehicle is correlated with the motor power and the transmission gear. The acceleration compensation apparatus also includes one or more sensors disposed within the vehicle and configured to provide real-time sensor data relating to a road load of the vehicle. The acceleration compensation apparatus also includes a processor which, in response to the real-time sensor data, updates the real-time throttle map and real-time shift map such that the torque of the vehicle is altered to a desired torque value based on the road load of the vehicle. Other embodiments of this aspect include corresponding control units, apparatus, and instructions recorded on one or more storage devices, each configured to perform the actions of the methods.

Implementations may include one or more of the following features. The apparatus where the desired torque value is selected to bring an acceleration of the vehicle into closer conformance with a desired vehicle acceleration based on the road load of the vehicle. The apparatus where the real-time sensor data includes at least one of carried mass, towed mass, air resistance, grade load, or rolling resistance. The apparatus further including the vehicle. Implementations of the described techniques may include hardware, a method or process, or control unit instructions on a control-unit-accessible medium.

The vehicle road load compensation system disclosed herein has particular, but not exclusive, utility for consumer and commercial cars and trucks with automatic transmission and internal combustion or hybrid propulsion.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the method, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
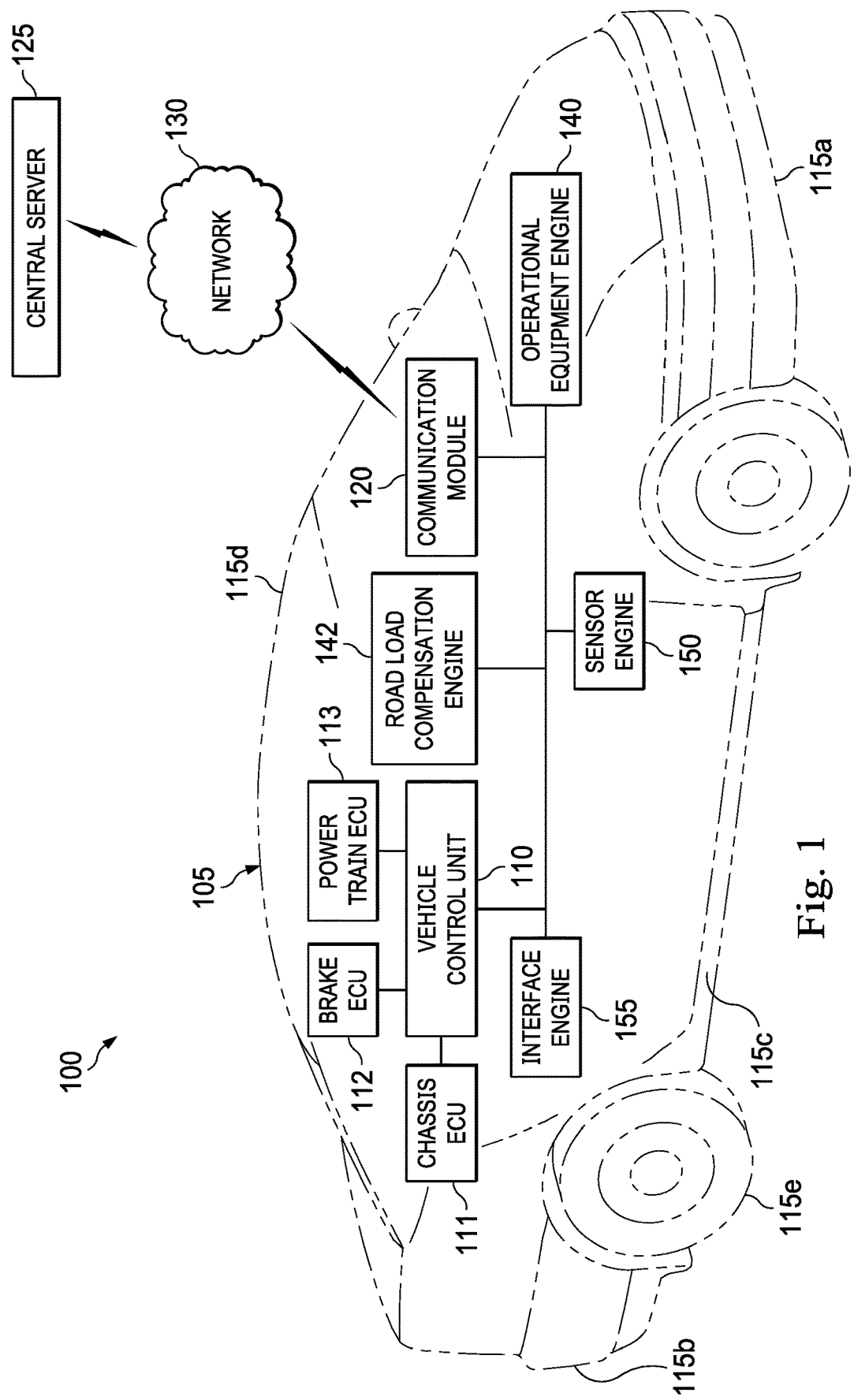
FIG. 1 is a diagrammatic illustration of a vehicle including a vehicle road load compensation system, in accordance with at least one embodiment of the present disclosure.

The present disclosure is generally directed to maintaining a constant, consistent relationship between accelerator pedal input and vehicle acceleration for varying road load conditions, such that a given accelerator pedal input achieves a given vehicle acceleration irrespective of road load conditions. Drivers and passengers of motor vehicles desire smooth, responsive acceleration to result from increases in accelerator pedal deflection. However, traditional linear throttle mapping and fixed shift mapping yields undesirable results, including periods of flat acceleration as well as sudden dips or increases in acceleration, and a "stuck" feeling from remaining in the same gear for too long.

After driving a vehicle for a certain duration, most drivers will become accustomed to the vehicle's accelerator pedal and will come to expect a particular (nominal) vehicle acceleration when applying a particular amount of accelerator pedal deflection (also referred to as pedal applied). However, vehicle acceleration for a given pedal applied changes as the road load of the vehicle increases or decreases, for example, based on vehicle mass (including cargo mass, luggage mass, retained precipitation, and the number and weight of vehicle occupants), towing (e.g., trailer pass and/or trailer drag), air resistance (headwind/tailwind, changes in vehicle profile), grade (uphill/downhill), and/or rolling resistance (friction coefficient). This requires the driver to readjust pedal applied to achieve the same vehicle acceleration for different road load characteristics. For example, for a given pedal applied, when traveling uphill the vehicle may accelerate less than when on a flat road, and may accelerate faster when traveling downhill. Thus the driver may be required to increase pedal applied when traveling uphill, and decrease pedal applied when traveling downhill, to achieve the same vehicle acceleration during uphill, downhill, and flat road conditions.

Vehicles currently implement grade logic and/or drive force demand logic to address such issues. For example, grade logic can change a transmission shift schedule based on grade to compensate vehicle drive force requirements, and drive force demand logic uses engine torque compensation to achieve drive force needed to reach desired acceleration based on acceleration pedal input. However, conventional grade logic still results in accelerator pedal input that varies to achieve the same vehicle acceleration depending on grade condition/changing grade load, and conventional drive force needed to reach a desired acceleration does not change or account for grade conditions.

Acceleration demand logic in some existing vehicles helps to maintain acceleration by compensating engine torque during dips or increases in acceleration. However, this logic alone cannot eliminate or substantially reduce flat acceleration during max engine torque limitation in a gear. Grade compensation logic compensates somewhat by altering the shift schedule to delay the upshift. Some existing vehicle systems activate the grade logic even at 0% grade in order to compensate for high elevation or high temperature, but such existing systems, rather than altering the overall shift schedule dynamically, can only inhibit upshifting, and only for a certain duration determined by a timer value to prevent a "stuck" feeling. Some vehicles also include logic to change the shift schedule in high elevation, high temperature, or other conditions. However, current logic simply changes between different fixed shift schedules rather than adapting dynamically in real time to meet customer expectations in different road load impact conditions.

Existing engine torque compensation systems may not consider actual vehicle acceleration. In particular, even if engine output is adjusted, such engine output (i.e., torque) may still not be sufficient to maintain a constant or desired vehicle acceleration based on a given accelerator input depending on gear. The vehicle control logic of the present disclosure not only adjusts engine output, but also recognizes that a gear shift, such as a downshift when the vehicle is in fifth gear, is necessary to maintain the desired vehicle acceleration. Changes in the lockup schedule of a torque converter are also implemented to favorably alter the relationship between accelerator pedal position and vehicle acceleration under diverse road load conditions.

Hereinafter referred to as a "vehicle road load compensation system," the present disclosure provides apparatus, systems, and methods to help to provide a constant vehicle acceleration response for a given accelerator pedal input, by dynamically adjusting the shift timing or shift mapping, engine torque compensation or throttle mapping, and torque converter lockup schedule, continuously in real time, to ensure that a given accelerator pedal input achieves the same vehicle acceleration irrespective of road load conditions.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes, and should not be considered to limit the scope of the vehicle road load compensation system. Certain features may be added, removed, or modified without departing from the spirit of the claimed subject matter.

FIG. 1 is a diagrammatic illustration of a vehicle road load compensation system in accordance with at least one embodiment of the present disclosure. In an example, a vehicle road load compensation system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vehicle road load compensation system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor 195 and drivetrain 200, sensor engine 150, and a road load compensation engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Figure 2:
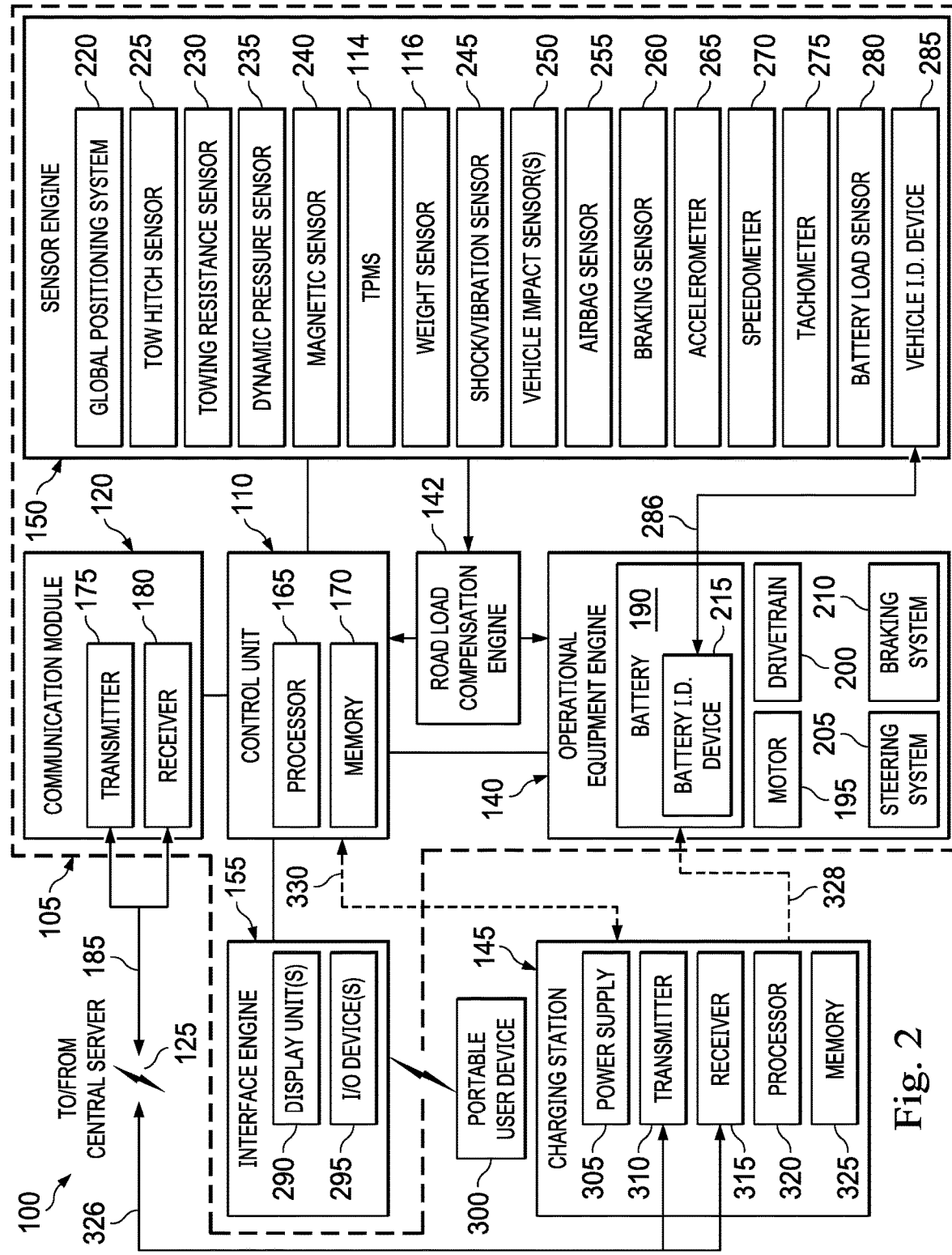
FIG. 2 is a diagrammatic illustration, in a block-diagram form, of at least a portion of the vehicle road load compensation system of FIG. 1, in accordance with at least one embodiment of the present disclosure.

FIG. 2 is a diagrammatic illustration, in a block-diagram form, of at least a portion of the vehicle road load compensation system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220 that can be used to determine road grade, a tow hitch sensor 225 (e.g., a tongue weight sensor), a towing resistance sensor (e.g., trailer hitch tensile load sensor) 230, a dynamic pressure sensor (e.g., Pitot tube) or anemometer 235 that can be used to determine a wind resistance magnitude or vector, a magnetic sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a TPMS 114 that monitors tire pressure and can be used to determine a tire-related friction coefficient, a weight sensor 116, or any combination thereof. The sensors or other detection devices may be configured to sense or detect activity, conditions, and circumstances in an area to which the device has access, e.g., ambient conditions or conditions within a battery compartment. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried onto the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The road load compensation system 100 also includes a road load compensation engine 142, the operation of which will be described below. In some embodiments, the road load compensation engine 142 comprises a standalone housing with its own processor and memory. In other embodiments, the acceleration compensation engine exists as software, firmware, or hardware within another processor, such as the vehicle control unit 110, operational equipment engine 140, or power train ECU 113. The sensor engine 150 includes environmental sensors and vehicle sensors.

A reader of ordinary skill in the art will understand that other components or arrangements of components may be found in a vehicle 105, and that the same general principles apply to electric vehicles, internal combustion vehicles, and hybrid vehicles.

Figure 3:
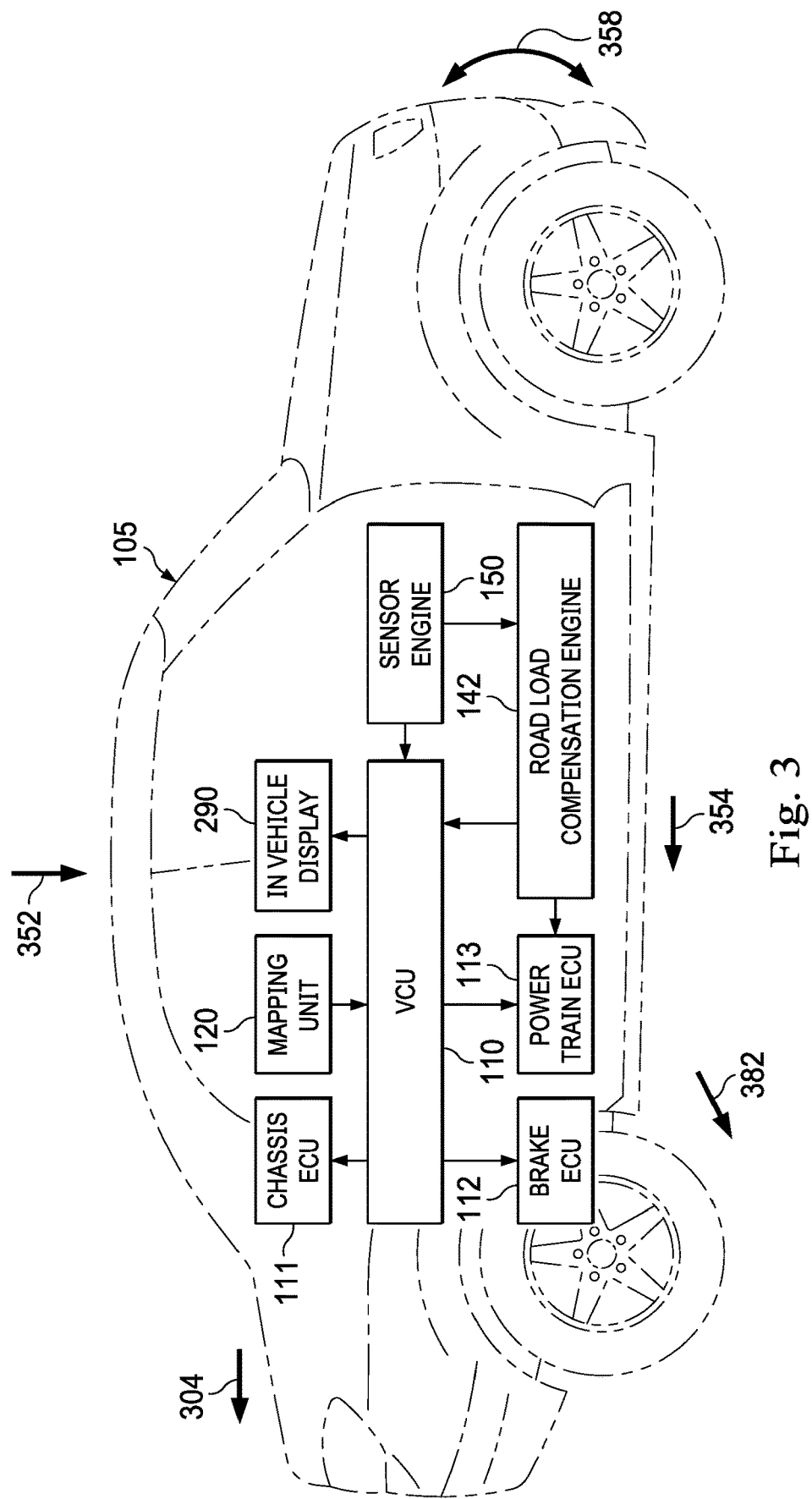
FIG. 3 is an exemplary diagrammatic illustration of the vehicle road load compensation system embodied as a vehicle in accordance with at least one embodiment of the present disclosure.

FIG. 3 is an exemplary diagrammatic illustration of the vehicle road load compensation system 100 embodied as a vehicle 105 in accordance with at least one embodiment of the present disclosure. In this implementation, for clarity, only certain engines, systems, and components are shown. However, other engines, systems, and components, including those describe herein, are also contemplated as being a part of the vehicle road load compensation system 100 shown in FIG. 3. In this example, within the vehicle 105 the VCU 110 receives information from a sensor engine 150, which receives information from environmental sensors and vehicle sensors. In addition, the VCU 110 sends information to the chassis ECU 111, brake ECU 112, power train ECU 113, and in-vehicle display 290.

Force variables that may be incorporated into physics calculations within the VCU 110 include but are not limited to the vehicle absolute weight 352, vehicle rolling friction 354, vehicle aerodynamic drag 304, and vehicle pitch 358. In some examples, each of these variables is a force that may be expressed in lbf, Newtons, or any other unit of force as desired. In an example, the vehicle pitch 358 is stored within the memory 170 of the Vehicle Control Unit 110, and is calculated based on data from the accelerometer 265 to provide a sensed acceleration, and the first derivative of the vehicle speed 270 from the speedometer 270 to provide an acceleration value tangent to the road surface. The difference between these two acceleration vectors indicates vehicle pitch 358. Vehicle pitch may also be measured with an inclinometer or geomagnetometer.

Other variables may not be directly known, but may be estimated from graphs, curves, or lookup tables for a nominal vehicle (e.g., vehicle weight 352, vehicle rolling friction 354, and vehicle aerodynamic drag 304). Some variables may be calculated or estimated from performance variables that normally exist within the VCU 110. For example, the combined mass, gross weight, or inertia of the vehicle 105 may be determined from the acceleration profile of the vehicle given a known force imparted by the motor 195 and drivetrain 200, and the Newtonian relationship F=ma. The mass of the carried load may then be estimated by subtracting a nominal or expected vehicle mass (e.g., stock weight or stock mass. Alternatively, if the road grade is known (e.g., from GPS data), the combined vehicle and carried load mass may be estimated based on the work or energy required for the operational equipment engine to push the vehicle uphill, or the force required hold it from rolling backward.

The total drag on the vehicle can be calculated based on the power output required to maintain a particular vehicle speed 270, and the sum of nominal or estimated values of the vehicle rolling friction 354 and aerodynamic drag 304. The ratio of aerodynamic drag to rolling friction can be estimated from known relationships for typical vehicles, or by other methods. The grade of the road or ground surface under the vehicle may be calculated from accelerometers, or may be calculated or taken directly from stored maps, GPS data or other indicators. The combination of vehicle weight 352, vehicle aerodynamic drag 304, and vehicle rolling friction 354 can be used to compute a vehicle rolling resistance vector 382 (e.g., as a vector sum of the force vectors). Histories, time averages, first derivatives, integrals, or filters of any of the aforementioned variables, along with known, anticipated, or estimated future values for some or all of the variables may also be incorporated into the physics calculations to improve or refine the results of the calculations. Accelerator pedal position may also be incorporated as being proportional to an expected power output from the motor 195.

The road load compensation system 100 also includes road load compensation engine 142, which accepts inputs from the sensor engine (e.g., inputs from the GPS 220, tow hitch sensor 225, weight sensor 116, accelerometer 265, and speedometer 270) and provides outputs, for example, to the VCU 110 or power train ECU 113.

Figure 4A:
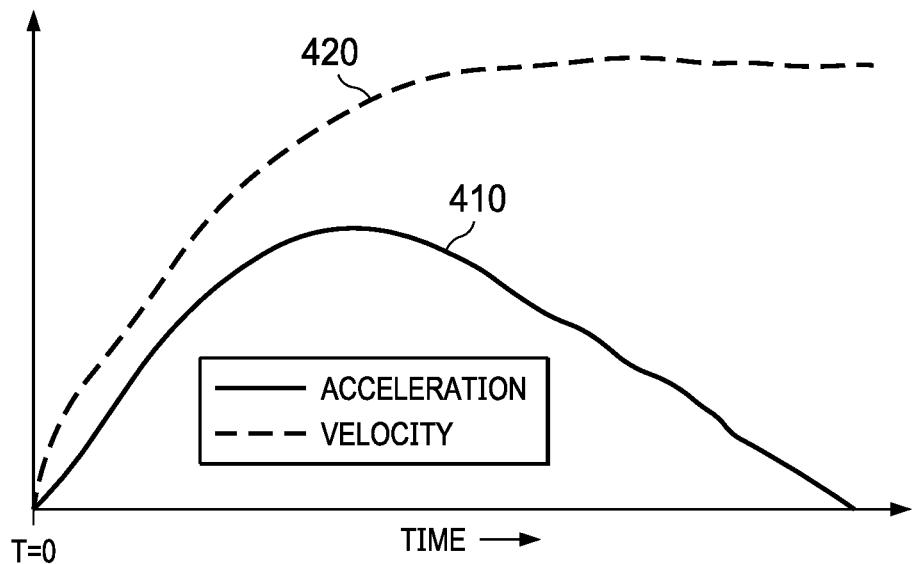
FIG. 4a is a diagrammatic representation of a desirable acceleration curve and velocity curve in response to an increase in accelerator pedal deflection.

FIG. 4a is a diagrammatic representation of a desirable acceleration curve 410 and velocity curve 420 in response to an increase in accelerator pedal deflection. The X-axis of the diagram represents increasing time (with T=0 representing the start of the acceleration event), and the Y-axis of the diagram represents either acceleration or velocity, with T=0 representing either zero velocity and acceleration (i.e., a standing start), or else a nonzero velocity and/or acceleration (i.e., acceleration from an intermediate cruising speed). The desirable acceleration profile 410 increases smoothly from zero to a peak value, and then declines smoothly thereafter, exhibiting no increases, decreases, or flat spots that deviate from this smooth function. The desirable velocity profile 420 increases smoothly from a starting value to an ending value, again exhibiting no other increases, decreases, or flat spots. The expectations of vehicle drivers and passengers are generally believed to match these desired curves, and to be violated by significant variations therefrom.

Figure 4B:
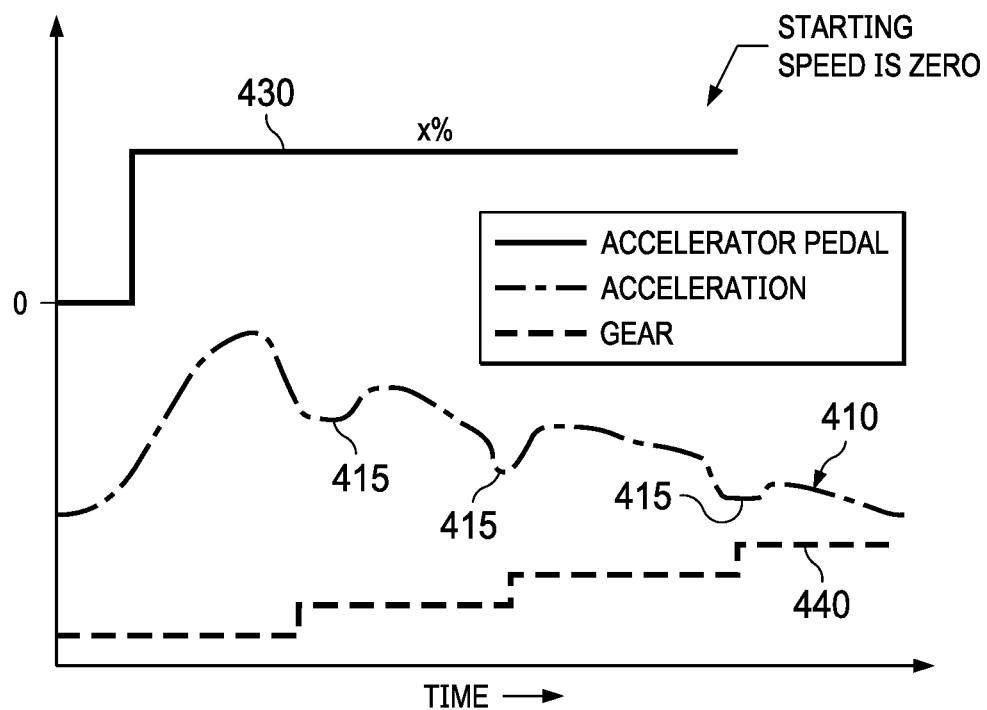
FIG. 4b is a diagrammatic representation of a more realistic, less idealized acceleration profile.

FIG. 4b is a diagrammatic representation of a more realistic, less idealized acceleration profile 410. The X-axis of the diagram represents increasing time from a standing start (i.e., acceleration from a starting speed of zero). The Y axis represents three values for a representative example vehicle: acceleration 410, accelerator pedal position 430, and gear selection 440. The accelerator pedal 430 begins at a resting position (i.e., zero deflection, commanding zero acceleration), and increases as a step function to a nonzero deflection (e.g., a ⅓$^{rd}$ depressed, 50% depressed, or fully depressed accelerator pedal 430), where it remains for the duration of the depicted time period. The gear selection 440 (i.e., the gear selected by an automatic transmission system or drivetrain 200) increases in three separate increments, from 1$^{st}$ gear to 2$^{nd}$ gear, then from 2$^{nd}$ gear to 3$^{rd}$ gear, and from 3$^{rd}$ gear to 4$^{th}$ gear.

As will be understood by a person of ordinary skill in the art, in the absence of compensation logic, this shift schedule results in an acceleration profile wherein the acceleration rises to a peak value, then declines at a non-constant rate, with marked dips 415 occurring in association with the shifts in gear. Such dips 415 in the acceleration profile 410 are readily perceptible to a vehicle's driver and passengers, and are generally believed to contribute to an undesirable driving experience as they conflict with the desirable acceleration profile 410 shown in FIG. 4*a*. The existence, timing, and size of such dips is vehicle-dependent and based on shift quality, which is a function of variables such as transmission design and transmission oil pressure. Reducing such dips 415 or otherwise rendering them less perceptible to drivers and passengers is indirectly addressed by the present disclosure, in the sense that torque changes will result in acceleration changes at these times.

Figure 5:
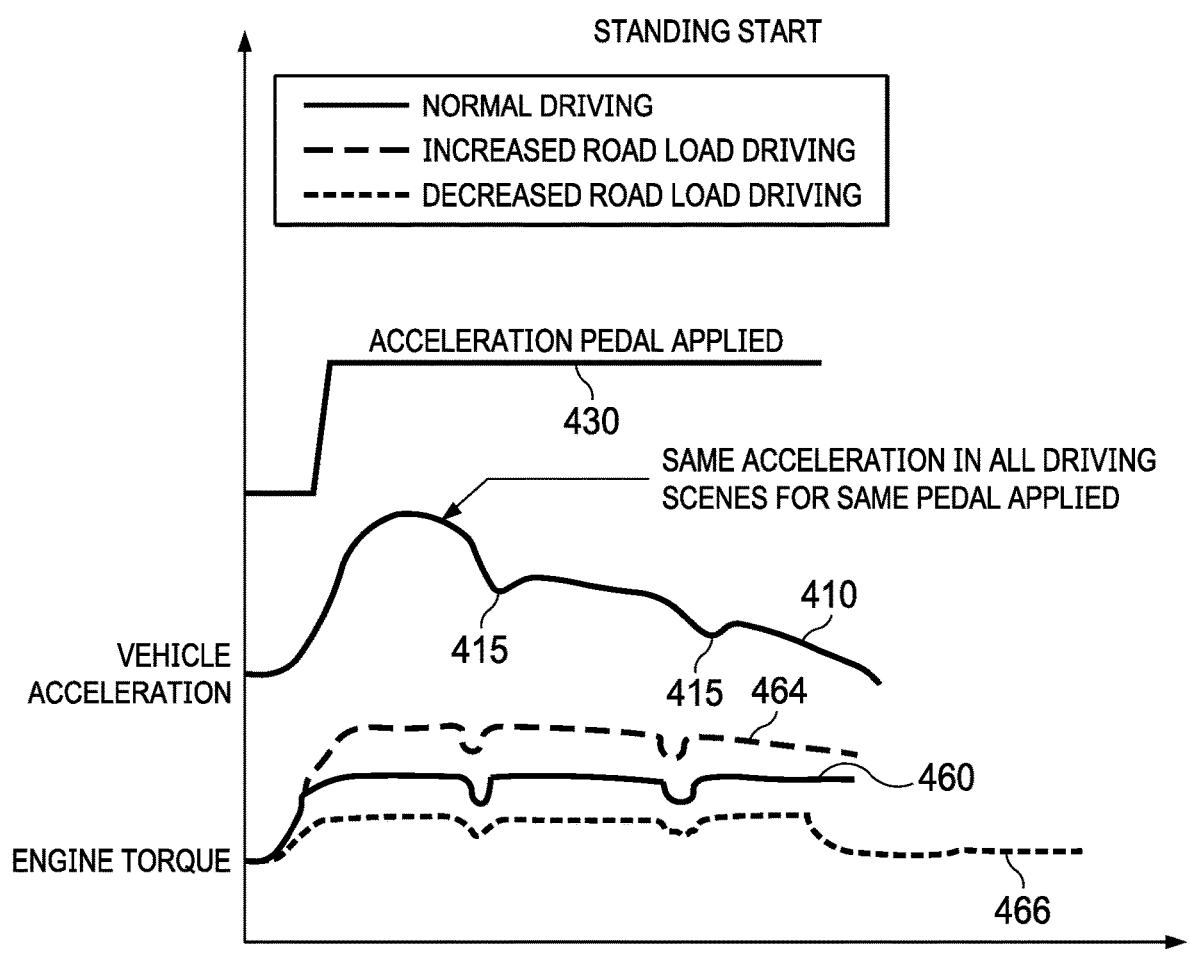
FIG. 5 is a diagrammatic representation of exemplary acceleration demand logic of the vehicle road load compensation system in accordance with at least one embodiment of the present disclosure.

FIG. 5 is a diagrammatic representation of exemplary acceleration demand logic of the vehicle road load compensation system 100 in accordance with at least one embodiment of the present disclosure. This depiction is similar to that of FIG. 4*b*, in that a step-function increase in pedal position 430 results in an acceleration profile 410 that increases for a period of time, then peaks, and then declines. Two acceleration dips 415, associated with upshifting of the transmission 200 into a higher gear, are visible. Line 460 shows the torque that the motor 195 must generate in order to support this acceleration profile 410 under nominal driving conditions (e.g., a flat road surface without high wind).

Line 464 shows an increased torque demand that is required to meet a condition of increased road load (e.g., an uphill grade, headwind, increase in cargo mass or number of passengers, or rain/snow loading). In this case, the sensor engine 150 may detect a mass increase via a weight sensor 116, or the addition of a towed load via a tow hitch sensor 225 that can detect trailer mass, trailer rolling resistance, or trailer tongue weight, or a change in acceleration via an accelerometer 265 or speedometer 270, or a change in road grade via an inclinometer or multi-axis accelerometer 265 or via a mapping unit or communication unit 120. In this case, the acceleration demand logic of the vehicle road load compensation system 100 will request greater torque output from the motor 195. This may be accomplished by a change in throttle mapping (see FIGS. 8 and 10).

Line 466 shows a decreased torque demand that is required to meet a condition of decreased road load (e.g., a downhill grade, tailwind, or decrease in cargo mass or number of passengers, or melting/drainage of rain or slow loads). In this case, the acceleration demand logic of the vehicle road load compensation system 100 will request a reduced torque output from the motor 195, resulting in less rotational force imparted through the transmission or drivetrain 200 to the wheels 115 of the vehicle 105.

The vehicle acceleration profile 410 may also be adjusted upward or downward through changes in the shift schedule or shift mapping (see FIG. 9*a*) or torque converter lockup schedule (see FIG. 9*b*), which may result in the acceleration dips 415 happening at different times than shown in the nominal acceleration profile 410.

Figure 6:
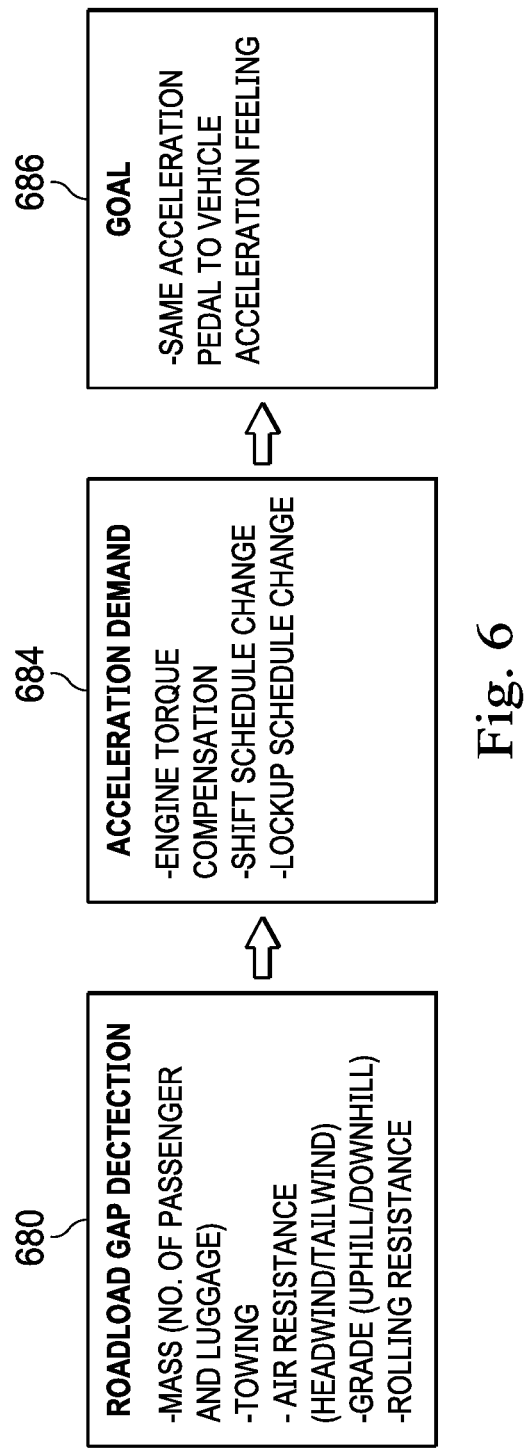
FIG. 6 is a diagrammatic representation of exemplary acceleration compensation logic of the vehicle road load compensation system in accordance with at least one embodiment of the present disclosure.

FIG. 6 is a diagrammatic representation of exemplary acceleration compensation logic of the vehicle road load compensation system 100 in accordance with at least one embodiment of the present disclosure. In this example, the road load compensation engine 142 detects effects 680 on road load.

Either within the road load compensation engine 142, the VCU 110, or the power train ECU 113, these factors are then used to adjust or compensate the acceleration demand 684 of the vehicle 105. This may be accomplished through changes in the throttle map 650, i.e., the instantaneous mapping between accelerator pedal position 430 (i.e., 0-100% depressed) and throttle valve angle (i.e., 0-100% open past idle position). The throttle of the vehicle 105 is configured to supply combustible fuel-air mixture to the motor 195 in proportion to the throttle valve angle, such that a greater throttle valve angle results in grater combustion and therefore greater engine power output or torque. Shift schedule and lockup schedule may also be altered. Changes in throttle mapping, shift schedule, and lockup schedule support the goal 686 of maintaining a consistent acceleration profile 410 for a given pedal position 430, regardless of the road load that exists on the vehicle 105 at any given moment.

The system 100 may carry out mass compensation, wherein an increase or decrease of the total vehicle mass (including passengers, cargo, precipitation loads, etc.) results in a new acceleration request 410 that is the design acceleration plus an acceleration change due to the weight change. Similarly, the system 100 may carry out towing compensation, where an addition, removal, or change in a towed load results in a new acceleration request 410. Similar compensations may be made for example due to a change in wind resistance caused by a headwind, tailwind, or the addition or removal of rooftop cargo, where wind resistance is a factor of air drag coefficient, vehicle frontal projected area, and vehicle speed relative to the moving air. Grade compensation may change the requested acceleration profile 410 based on a change in grade load (weight*sine (road slope)), while rolling resistance compensation may change the requested acceleration profile 410 based on a change in rolling resistance (e.g., an increase or decrease in road friction due for example to changes in road texture, potholes, frost heaves, or partial blockage by lightweight debris such as tumbleweeds).

Figure 7:
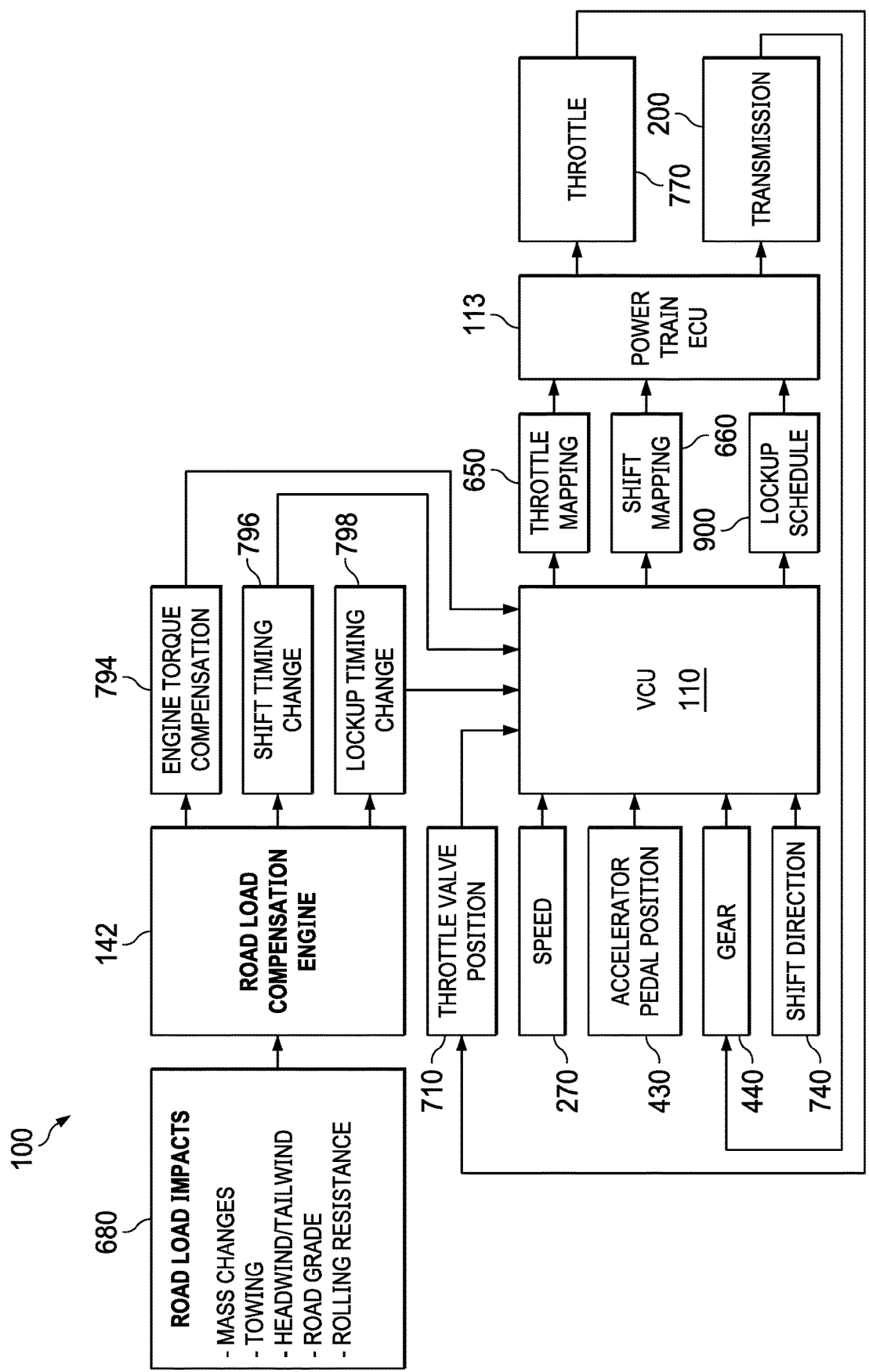
FIG. 7 is a diagrammatic representation of exemplary acceleration compensation logic of the vehicle road load compensation system in accordance with at least one embodiment of the present disclosure.

FIG. 7 is a diagrammatic representation of exemplary acceleration compensation logic of the vehicle road load compensation system 100 in accordance with at least one embodiment of the present disclosure. This diagram provides a more detailed view of the relationships between processes and variables than that shown in FIG. 6.

In this example, during normal operation, the VCU 110 receives input variables including but not limited to throttle valve position 710, speed 270, accelerator pedal position 430, transmission gear 440, and shift direction 740 (i.e., whether a recent or upcoming gear shift is an upshift to a higher gear or a downshift to a lower gear). Based on these values (and potentially others such as road grade and towed or carried load) the VCU 110 computes in real time the throttle map 650, shift map 660, and lockup schedule or lockup map 900, which are then passed to the power train ECU 113, which operates the throttle 770 and transmission or power train 200. Adjustments to the throttle 770 result in a new throttle valve position 710. Adjustments to the transmission 200 result in a new gear 440.

In this example, the throttle mapping 650 and shift mapping 660 are also affected by road load impacts 680 as described below. The road load impacts 680 may include changes in carried mass, changes in towed mass, changes in air resistance (e.g., headwind or tailwind), changes in road grade, and changes in rolling resistance. These values are fed into the road load compensation engine 142, which computes an engine torque compensation 794 (implemented for example by a motor ECU), a shift timing change 796 (implemented for example by a transmission or drive train ECU, or a power train ECU controlling both motor and transmission functions), and lockup timing change 798, which are fed into the VCU 110. Based on this information, the VCU makes continuous, real-time adjustments to the throttle mapping 650 to adjust engine torque, and also to the shift mapping 660 to change the timing of gear shifts (either earlier or later) and torque converter lockup schedule 900. These changes maintain a constant or nearly constant acceleration profile 410 as described below, with the goal of keeping the relationship between time, pedal position, acceleration, and velocity as close to the desirable or expected relationship as possible. Adjustments made in real time may be made on a timed loop, such as for example every second, every 10 seconds, every minute, etc., and may potentially occur as frequently as the loop time of the processor on which the updates are occurring (e.g., every 40 msec), which may be advantageous under some conditions.

Figure 8:
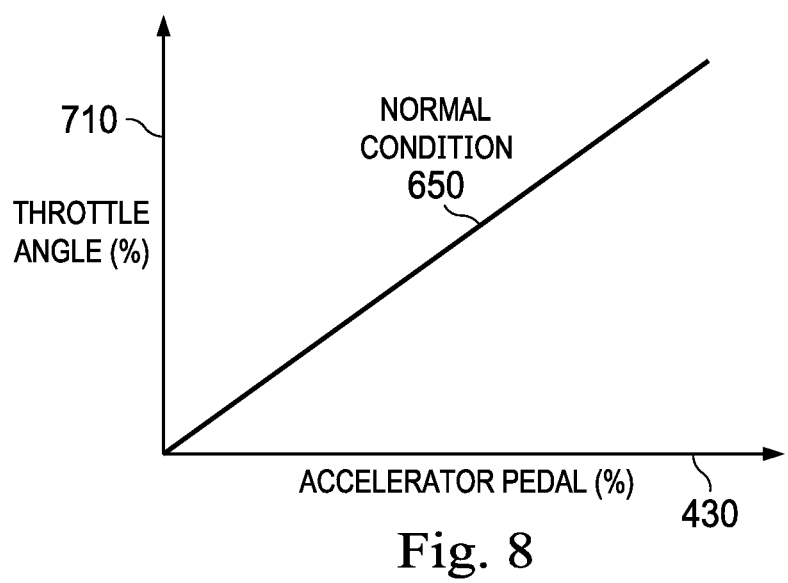
FIG. 8 is a diagrammatic representation of a conventional throttle mapping.

FIG. 8 is a diagrammatic representation of a conventional throttle mapping 650. Under normal conditions (i.e., without acceleration compensation logic), the throttle mapping 650 (i.e., the relationship between accelerator pedal position 430 and throttle valve position 710) is linear, such that 0% deflection of the accelerator pedal 430 equates to approximately 0% opening of the throttle 770 beyond the idle setting, whereas 50% deflection of the accelerator pedal 430 results in approximately 50% opening of the throttle 770 beyond the idle setting, and 100% deflection of the accelerator pedal 430 results in approximately 100% opening of the throttle 770 beyond the idle setting. This "normal", linear throttle mapping is associated with the acceleration profile 410 shown in FIG. 4b and FIG. 5.

Figure 9A:
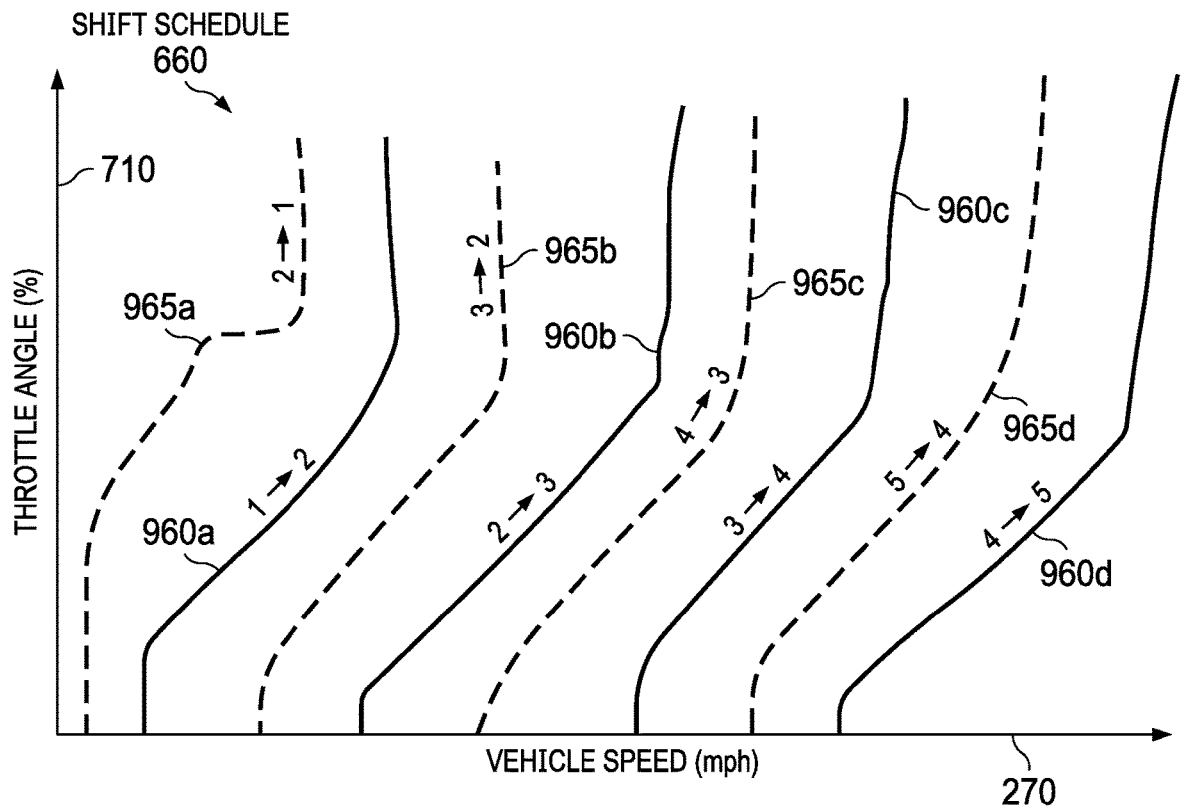
FIG. 9a is a diagrammatic representation of exemplary shift schedule mapping compensation logic of the vehicle road load compensation system in accordance with at least one embodiment of the present disclosure.

FIG. 9a is a diagrammatic representation of exemplary shift schedule mapping 660 compensation logic of the vehicle road load compensation system 100 in accordance with at least one embodiment of the present disclosure. In a traditional automatic transmission vehicle 105, the shift schedule or shift mapping 660 (i.e., the relationship between speed 270, throttle angle 710, and transmission gear 440) is the same regardless of road load impacts 680 or shift direction 740. This traditional shift schedule or shift mapping 660 is associated with the undesirable acceleration profile 410 depicted in FIG. 4b and FIG. 5.

In the embodiment shown in the FIG. 9a, the shift schedule 660 is adjusted based on torque impacts 680 as described above, and also adjusted based on whether the transmission 200 is shifting into a higher or lower gear 440. The acceleration upshift schedule is shown by the solid lines 960a, 960b, 960c, and 960d, and represents the combinations of speed 270 and throttle angle 710 at which the transmission 200 will shift from first gear to second gear, second gear to third gear, third gear to fourth gear, and fourth gear to fifth gear, respectively. For example, if the transmission 200 is in second gear, and a hypothetical status point, whose X value is the current vehicle speed 270 and whose Y value is the current throttle angle 710, falls to the left of line 960b, the transmission 200 will remain in second gear, whereas if the hypothetical status point falls to the right of line 960b, the transmission 200 will be commanded to switch from second gear to third gear in order to decrease engine RPMs.

The acceleration downshift schedule is shown by the dotted lines 965a, 965b, 965c, and 965d, and represents the combinations of speed 270 and throttle angle 710 at which the transmission 200 will shift from $2^{nd}$ gear to $1^{st}$ gear, $3^{rd}$ gear to $2^{nd}$ gear, $4^{th}$ gear to $3^{rd}$ gear, and $5^{th}$ gear to $4^{th}$ gear, respectively. For example, if the transmission 200 is in third gear, and a hypothetical status point, whose X value is the current vehicle speed 270 and whose Y value is the current throttle angle 710, falls to the left of line 965b, the transmission 200 will remain in third gear, whereas if the hypothetical status point falls to the right of line 965b, the transmission 200 will be commanded to switch from third gear to second gear in order to increase torque.

During typical driving scenarios, the acceleration upshift schedule is followed when the vehicle 105 accelerating normally from a low or zero initial speed 270 to a higher speed 270, and results in reduced engine noise and vibration as well as increased fuel economy. The acceleration downshift schedule is followed when the vehicle 105 is accelerating suddenly (e.g., for passing), or when the vehicle is decelerating. As compared with an uncompensated shift schedule or shift mapping 660, the compensated shift schedule or shift mapping 660 shown in in FIG. 9a results in earlier downshifts (i.e., downshifting at a lower speed) and later upshifts (i.e., upshifting at a higher speed, or holding the lower gear for longer), with the goal of altering the acceleration profile 410 and velocity profile 420 to more closely resemble the ideal shown in FIG. 4a as opposed to the profile shown in FIG. 4b.

This exemplary diagram shows a snapshot of the shift mapping for a particular vehicle at a particular instant under particular conditions. It should be understood that in some embodiments of the road load compensation system 100 of the present disclosure, the road load compensation engine 142, VCU 110, and/or power train ECU 113 continuously recalculate the compensated shift mapping 660 in real time based on the road load impacts 680 that are detected at that particular instant. It is noted that if the shift mapping is based on speed and throttle position, then recalculation of the throttle mapping automatically results in a change to the shift mapping. However, in other embodiments the shift mapping may be based on other variables including but not limited to accelerator pedal position 430, torque, drive force, acceleration 410, or other variables, which would replace throttle position as the Y-axis or replace speed as the X-axis of FIG. 9a.

Figure 9B:
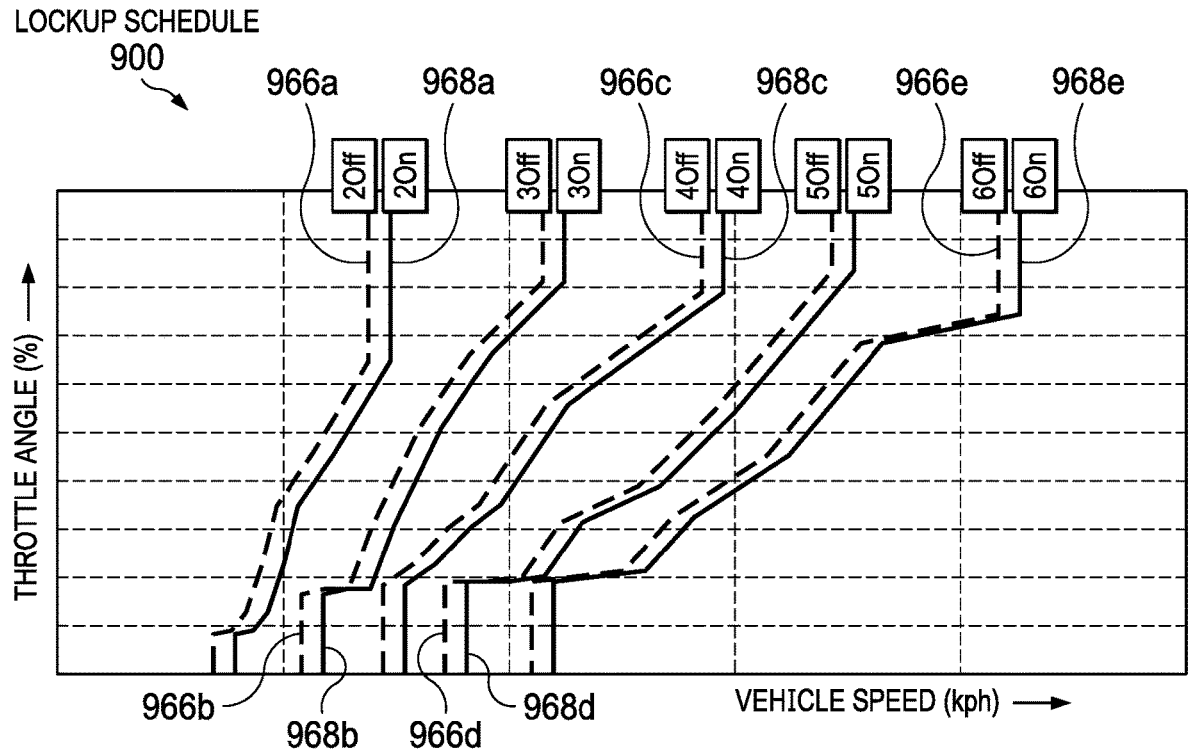
FIG. 9b is a diagrammatic representation of exemplary lockup schedule compensation logic of the vehicle road load compensation system in accordance with at least one embodiment of the present disclosure.

FIG. 9b is a diagrammatic representation of exemplary lockup schedule compensation logic of the vehicle road load compensation system 100 in accordance with at least one embodiment of the present disclosure. FIG. 9b is similar to FIG. 9a, except that it represents a compensated lockup schedule or lockup mapping 900 rather than a shift schedule or shift mapping 660.

In an automatic transmission vehicle, the transmission 200 may include a torque converter, which is a fluid coupling that transfers engine torque into transmission torque. If the transmission 200 is in a torque converter unlocked state (i.e., transmission input RPM does not equal to engine output RPM), then the torque can be multiplied, such that the wheels 115 can receive more torque without the need for the transmission 200 to downshift. However, drivers generally do not like the sensation of the unlocked torque converter state, as there is no direct correspondence between the accelerator pedal position 430 and the acceleration 410 of the vehicle 105. If the transmission 200 is in a torque converter locked state (i.e., transmission RPM equal to engine RPM), then torque is restricted, but customers feel a satisfying correspondence between accelerator pedal position 430 and acceleration 410.

In some embodiments of the present disclosure, the vehicle road load compensation system 100 modifies the lockup schedule 900 rather than the shift schedule 660. In other embodiments, the vehicle road load compensation system 100 may select dynamically between modifying the shift schedule and modifying the lockup schedule, depending on which one will best maintain the expected acceleration profile under the given set of road load impacts 680. In still other embodiments, the shift schedule and lockup schedule may be varied simultaneously, which may be advantageous under some conditions.

Dotted lines 966a, 966b, 966c, 966d, and 966e represent the combinations of throttle angle and speed in gears 2, 3, 4, 5, and 6, respectively, at which lockup is turned off, such that the RPM of the transmission 200 is free to diverge from the RPM of the motor 195. Solid lines 968a, 968b, 968c, 968d, and 968e represent the combinations of throttle angle and vehicle speed in gears 2, 3, 4, 5, and 6, respectively, at which lockup is turned back on. In some embodiments, even the compensated lockup schedule still holds the transmission 200 in an unlocked state for only brief intervals, as can be seen by the narrow separation between each dotted line 966 and its corresponding solid line 968, as compared with the substantially larger separation between each dotted line 960 and the next dotted line 960 in the sequence.

As with FIG. 9a, the Y-axis represents a schedule based on throttle angle and an X-axis based on vehicle speed. However, a person of ordinary skill in the art will understand that either or both of these could be replaced with other variables, including but not limited to accelerator pedal position 430, torque, drive force, road load, or acceleration 410.

Figure 10:
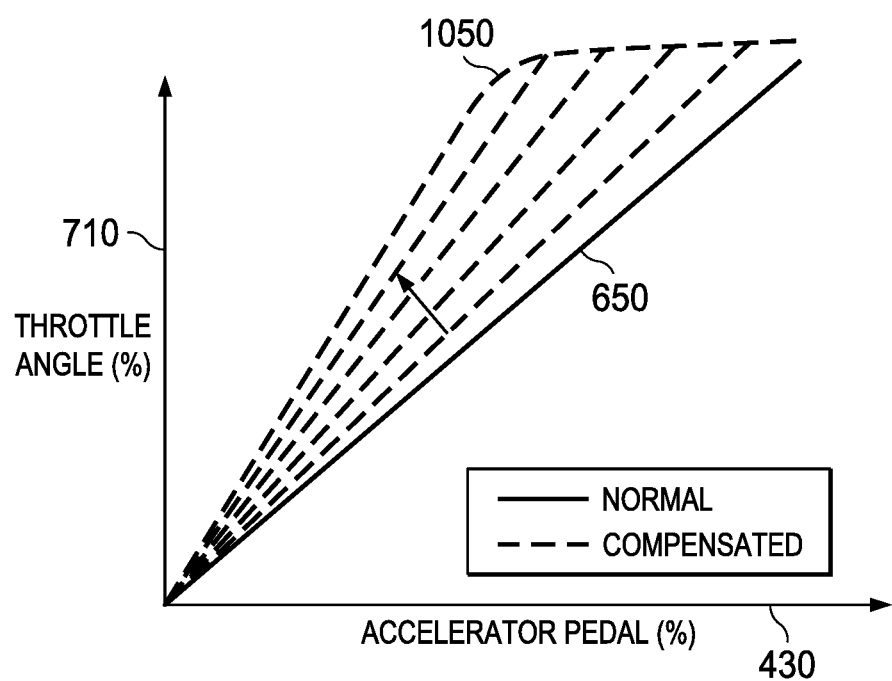
FIG. 10 is a diagrammatic representation of an exemplary throttle mapping of the vehicle road load compensation system in accordance with at least one embodiment of the present disclosure.

FIG. 10 is a diagrammatic representation of an exemplary throttle mapping 650 of the vehicle road load compensation system 100 in accordance with at least one embodiment of the present disclosure. As compared with FIG. 8, the linear relationship 650 between accelerator pedal position 430 and throttle angle (shown by the solid line 650) may be compensated to a more complex curve (shown by the dotted lines 1050) based on a computed acceleration requirement. Although the exemplary compensated curves 1050 retain the same endpoints as the uncompensated line, i.e., a 0% pedal deflection 430 still results in an approximate 0% throttle angle 710 above the idle position, and a 100% pedal deflection 430 (i.e., fully depressed accelerator pedal) still results in approximately a 100% throttle angle (i.e., fully open throttle valve). However, in the example shown in curve 1050, for pedal positions 430 less than about 66%, the slope of the throttle angle vs. pedal angle curves 1050 is steeper than that of the line 650, and for pedal positions closer to 100%, the slope of the throttle angle vs. pedal angle curves 1050 is shallower than that of the line 650, resulting in greater overall throttle opening, but less change in throttle angle 710 as the pedal angle 430 is increased or decreased. This combination of features improves the acceleration profile 410 by making it look more like the ideal acceleration profile 410 shown in FIG. 4a and less like the acceleration profile 410 shown in FIG. 4b. Curves 1050 show different compensated throttle mappings, based on different input parameters or different calculations.

Each exemplary dotted line 1050 shows a snapshot of the throttle mapping 1050 for a particular vehicle at a particular instant under particular conditions. It should be understood that in some embodiments of the road load compensation system 100 of the present disclosure, the road load compensation engine 142, VCU 110, and/or power train ECU 113 continuously recalculate the compensated throttle mapping 1050 in real time based on the road load impacts 680 that are detected at the time of each recalculation.

Figure 11A:
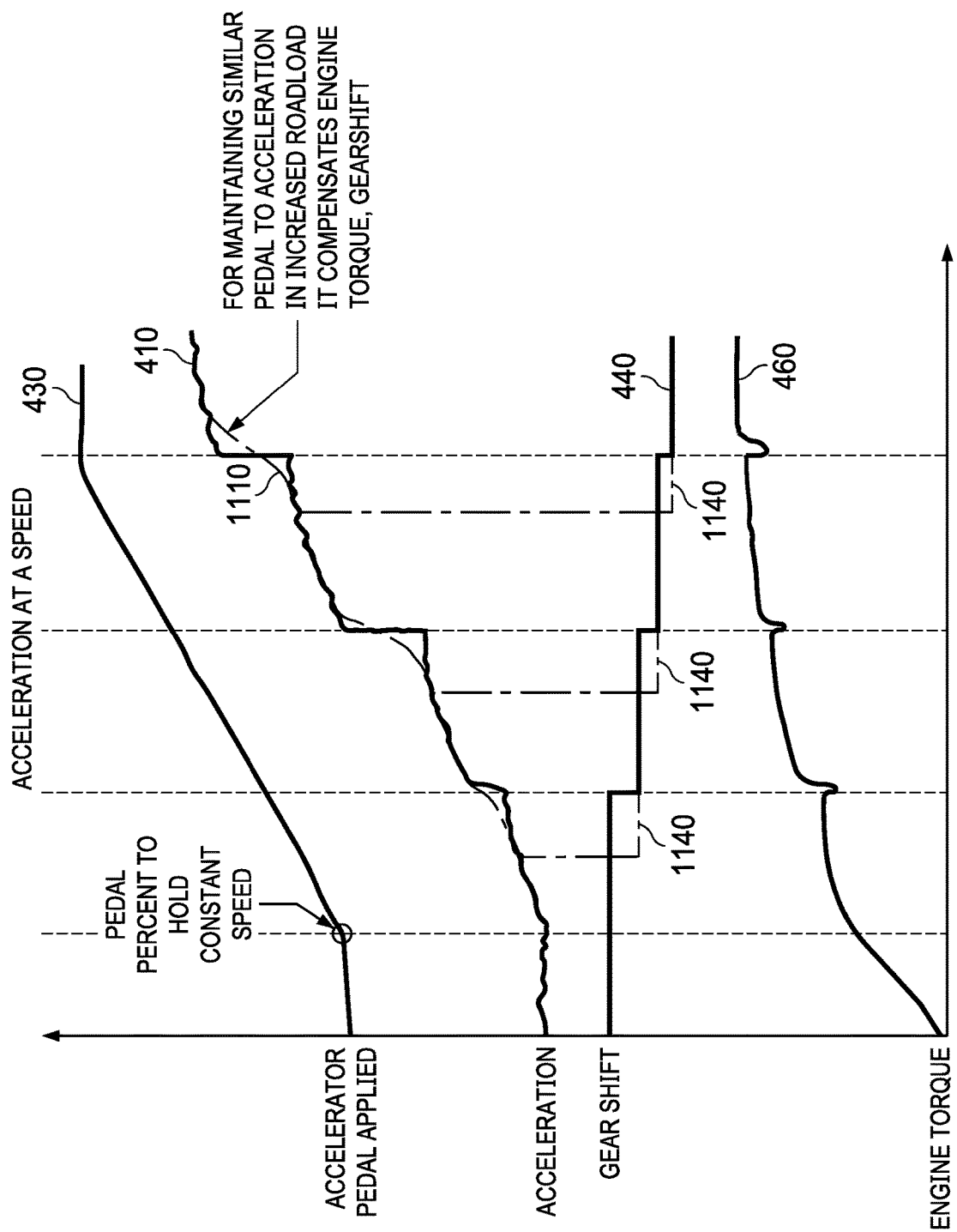
FIG. 11a is a diagrammatic representation of another aspect of the vehicle road load compensation system 100 in accordance with at least one embodiment of the present disclosure.

FIG. 11a is a diagrammatic representation of another aspect of the vehicle road load compensation system 100 in accordance with at least one embodiment of the present disclosure. In this diagram, the horizontal axis represents increasing time, while the vertical axis represents several different variables. The solid lines in the figure depict example pedal position 430, gear selection 440, and vehicle acceleration 410 for a smooth pedal increase beginning at a cruising speed 270 of, for example, 65 miles per hour. The performance of the road load compensated vehicle 105 is depicted by the dotted lines 1110 for acceleration and 1140 for gear selection. As can be seen in the figure, beginning at the example cruising speed (e.g., 65 mph), the accelerator pedal 430 is depressed smoothly from a 0% deflection position to a 100% deflection position over a first time period, and then held at 100% deflection for a second time period.

In this example, as a result of the shift schedule compensation (an example of which is depicted in FIG. 9), the road load compensation system 100 commands an early downshift schedule. As a result of both the throttle angle compensation or engine torque compensation 794 (an example of which is depicted in FIG. 10) and the shift schedule compensation 796 (an example of which is depicted in this figure, and another example of which is depicted in FIG. 9), the acceleration profile 1110 is smoother as compared with the uncompensated acceleration curve 410. This compensated acceleration profile 1110 is more in line with desired acceleration profile 410 depicted in FIG. 4a, and thus results in a more satisfactory driving experience.

Additionally, visible is the requested engine torque 450, which in this example is not adjusted along with the shift schedule, although in some embodiments the shift schedule and throttle mapping are both adjusted.

Figure 11B:
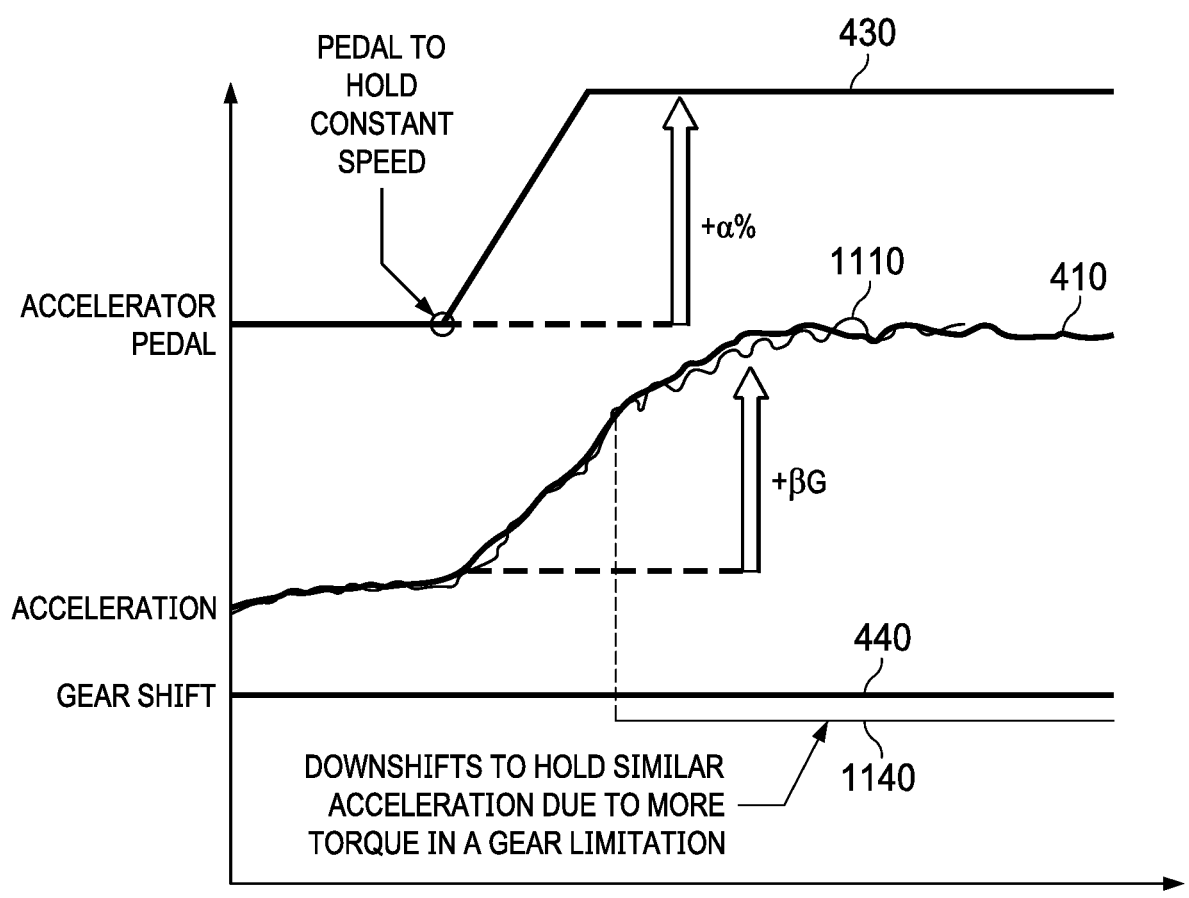
FIG. 11b is a diagrammatic representation of another aspect of the vehicle road load compensation system in accordance with at least one embodiment of the present disclosure.

FIG. 11b is a diagrammatic representation of another aspect of the vehicle road load compensation system 100 in accordance with at least one embodiment of the present disclosure. In this diagram, once again, the horizontal axis represents increasing time, while the vertical axis represents several different variables. Visible are the accelerator pedal position 430, gear selection 440, compensated gear selection 1140, acceleration 410 and compensated acceleration 1110. As can be seen, in this example, the accelerator pedal is deflected by an amount labeled as α %, which results in the gear 440 being held constant, resulting in a nominal acceleration profile 410 with a corresponding increase in acceleration of β (measured for example in G's). In this example, a change in road load has resulted in a downshift of the gear 1140 being commanded, in order to hold the compensated acceleration curve 1110 approximately equal to the nominal or expected acceleration curve 410.

Figure 12:
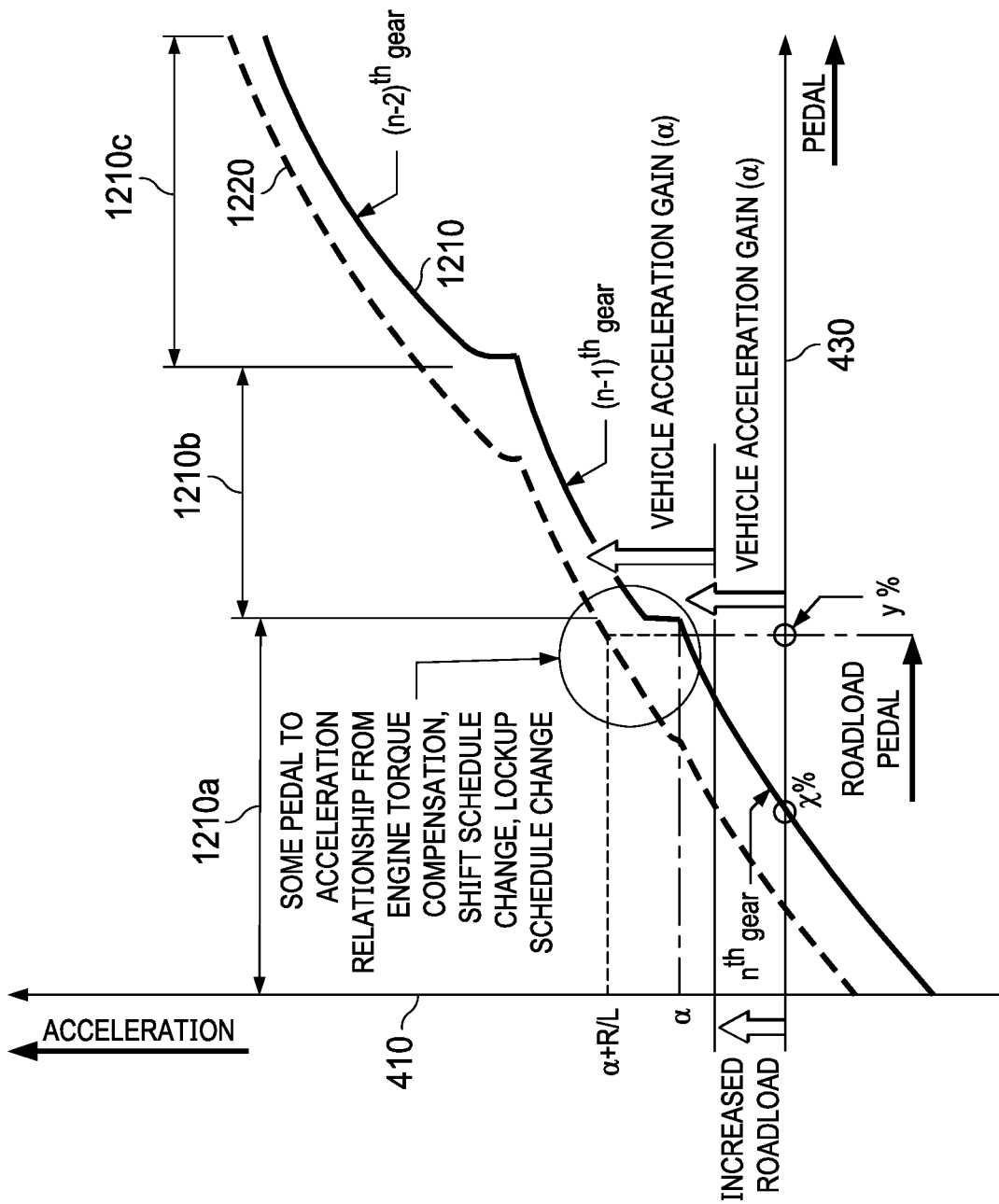
FIG. 12 is a diagrammatic representation of another aspect of the vehicle road load compensation system in accordance with at least one embodiment of the present disclosure.

FIG. 12 is a diagrammatic representation of another aspect of the vehicle road load compensation system 100 in accordance with at least one embodiment of the present disclosure. In this exemplary throttle mapping diagram, the X-axis represents accelerator pedal deflection 430, while the Y-axis represents a resulting acceleration request 410. In the nominal case 1210, the acceleration 410 increases in three different regions, labeled 1210a, 1210b, and 1210c, representing nth gear, (n−1)th gear, and (n−2)th gear, respectively.

As shown in the diagram, a vehicle is initially traveling at a constant speed (acceleration=0) with an initial pedal deflection of x %. Even under increased road load conditions, a similar pedal value of x % will be required for maintaining the same constant speed. When the accelerator pedal deflection is increased from the initial position of x % to an increased position of y %, the vehicle experiences an acceleration gain of α. However, in a condition of increased road load, the system 100 commands a compensated acceleration curve 1220, which is greater overall. Thus, the value for the compensated acceleration 1220 for the increased pedal position of y % is α+RL. However, because the system 100 adjusts throttle mapping with the specific goal of producing the same acceleration response regardless of road load, the vehicle acceleration gain in the compensated case 1220 is equal to α, i.e., identical or nearly identical to the acceleration gain in the uncompensated case 1210. As with the examples shown in FIGS. 5, 11*a*, and 11*b*, this results in a better match with consumer expectations, and thus a more satisfying driving experience.

A number of variations are possible on the examples and embodiments described above. For example, the technology described herein may be implemented on manually controlled vehicles or driver-assist vehicles, or may control a shift-assist feature in vehicles with manual or semi-manual transmissions. The recalculation of throttle mapping, shift mapping, or lockup mapping need not be continuous, but may occur intermittently, or on a regular or irregular schedule. The technology described herein may be implemented in diverse combinations of hardware, software, and firmware, depending on the implementation or as necessitated by the structures and modules already present in existing vehicles. The system may be employed on vehicles with automatic transmission. The system (excluding lockup schedule change) may be also implemented on dual clutch transmission (DCT) vehicles. Other names for DCT include PDK (Porsche), DSG (VW), and MDCT (BMW). The acceleration compensation for transmission shift schedule including lockup schedule may be applied to vehicles with simulated shifting, including continuously variable transmission (CVT), infinitely variable transmission (IVT), and hybrid transmissions (e.g., a hybrid vehicle with 4-speed automatic transmission simulating 10 gears). The lockup schedule compensation aspects of the system may be applied to diverse transmission types that include a torque converter. The throttle mapping aspects of the system may be applied to any vehicle with an internal combustion engine, regardless of mated transmission type. In this case, the transmission may be manual, CVT, IVT, etc.

Accordingly, the logical operations making up the embodiments of the technology described herein may be referred to variously as operations, steps, objects, elements, components, or modules. Furthermore, it should be understood that these may be arranged in any order, unless explicitly claimed otherwise or a specific order is necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vehicle road load compensation system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the vehicle road load compensation system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, additional sensors such as weight sensors, inclinometers, magnetometers, GPS, and accelerometers may be employed to compute wind load and other related parameters that affect vehicle response and therefore the desired engine torque compensation and shift timing change. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure. The principles described above can be equally applied to electric vehicles by a person of ordinary skill in the art, wherein the throttle is an electric motor voltage or current selection.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle road load compensation system, comprising:
   an accelerator pedal disposed within a vehicle and having an accelerator pedal position;
   a throttle disposed within the vehicle and configured to supply motor power in proportion to a throttle position;
   a transmission disposed within the vehicle and configured to shift in a shift direction between two or more fixed transmission gears, wherein a vehicle torque is generated proportional to the transmission gear and the motor power; and
   a control unit disposed within the vehicle and configured to receive real-time sensor data from one or more sensors relating to a road load of the vehicle, the control unit comprising:
      a real-time throttle map relating the accelerator pedal position to the throttle position, such that a given accelerator pedal position directs a corresponding target throttle position;
      a real-time shift map relating a desired transmission gear to a current transmission gear, current vehicle speed, and current throttle position, such that a given vehicle speed, given throttle position, and given transmission gear directs a corresponding target transmission gear; and
   wherein in response to the receiving of the real-time sensor data, the control unit updates the real-time throttle map and real-time shift map such that the vehicle torque is altered to a desired torque value based on the road load of the vehicle.

2. The system of claim 1, further comprising a real-time lockup map relating a torque converter lockup condition to the transmission gear, vehicle speed, and throttle position, such that the given vehicle speed, given throttle position, and given transmission gear directs a corresponding lockup condition selected from locked or not locked based on the road load of the vehicle.

3. The system of claim 2, wherein at least one of engine torque, shift schedule or lock up schedule are adjusted such that a relationship between the accelerator pedal position and an acceleration of the vehicle remains constant when the road load of the vehicle changes.

4. The system of claim 2 wherein the desired torque value is selected to reduce a size or a duration of an increase in vehicle acceleration, or to reduce a period of time wherein the vehicle acceleration is flat.

5. The system of claim 1, wherein the real-time sensor data comprises at least one of carried mass, towed mass, air resistance, grade load, or rolling resistance.

6. The system of claim 1, wherein at least one of carried mass, towed mass, air resistance, grade load, or rolling resistance is derived from the real-time sensor data.

7. The system of claim 1, wherein the real-time throttle map is nonlinear.

8. The system of claim 1, wherein the real-time throttle map is further dependent on the shift direction.

9. The system of claim 1, further comprising the vehicle.

10. A method for adjusting a torque of a vehicle to compensate for changes in road load, the method comprising:
measuring a speed and acceleration of the vehicle;
measuring an accelerator pedal position of the vehicle;
controlling a throttle of the vehicle based on the measured accelerator pedal position and a throttle mapping that relates the accelerator pedal position to a throttle position, wherein the throttle position is correlated to a motor power;
controlling a transmission of the vehicle to shift in a shift direction from one fixed transmission gear to a selected fixed transmission gear based on a shift mapping that relates a desired transmission gear to the measured speed of the vehicle and the measured accelerator pedal position, wherein each transmission gear relates the motor power to a vehicle torque;
modifying the throttle mapping in real time based on sensor data relating to a road load of the vehicle; and
modifying the shift mapping in real time based on the sensor data,
such that the vehicle torque is altered to a desired torque value based on the road load of the vehicle.

11. The method of claim 10, wherein the desired torque value is selected to bring the measured acceleration of the vehicle into closer conformance with a desired vehicle acceleration profile based on the road load of the vehicle.

12. The method of claim 10, wherein the sensor data comprises at least one of carried mass, towed mass, air resistance, grade load, or rolling resistance.

13. The method of claim 10, further comprising controlling a torque converter lockup of the vehicle to select a lockup state selected from locked or unlocked, based on a lockup mapping that relates a desired lockup state to the speed of the vehicle, the throttle position, and the selected fixed transmission gear; and
modifying the lockup mapping in real time based on the sensor data.

14. The method of claim 10, wherein the throttle mapping is further modified based on the shift direction.

15. The method of claim 10, wherein the sensor data is employed to derive at least one of carried mass, towed mass, air resistance, grade load, or rolling resistance.

16. The method of claim 10, further comprising providing the vehicle.

17. An acceleration compensation apparatus comprising:
a memory comprising:
a real-time throttle map relating an accelerator pedal position of a vehicle to a throttle position of the vehicle, such that a given accelerator pedal position directs a corresponding throttle position, wherein a motor power of the vehicle is correlated with the throttle position;
a real-time shift map relating a desired transmission gear to a current shift direction, vehicle speed, and throttle position, such that a given vehicle speed, throttle position, shift direction and transmission gear directs a corresponding transmission gear, wherein a torque of the vehicle is correlated with the motor power and the transmission gear;
one or more sensors disposed within the vehicle and configured to provide real-time sensor data relating to a road load of the vehicle; and
a processor which, in response to the real-time sensor data, updates the real-time throttle map and real-time shift map such that the torque of the vehicle is altered to a desired torque value based on the road load of the vehicle.

18. The apparatus of claim 17, wherein the desired torque value is selected to bring an acceleration of the vehicle into closer conformance with a desired vehicle acceleration based on the road load of the vehicle.

19. The apparatus of claim 17, wherein the real-time sensor data comprises at least one of carried mass, towed mass, air resistance, grade load, or rolling resistance.

20. The apparatus of claim 17, further comprising the vehicle.

* * * * *